(12) United States Patent
Dienst

(10) Patent No.: US 11,337,363 B2
(45) Date of Patent: May 24, 2022

(54) CALIBRATING A DEPTH CONTROL SYSTEM OF A ROW UNIT IN AN AGRICULTURAL PLANTER

(71) Applicant: CNH Industrial America LLC, New Holland, PA (US)

(72) Inventor: Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 425 days.

(21) Appl. No.: 16/145,737

(22) Filed: Sep. 28, 2018

(65) Prior Publication Data

US 2020/0100423 A1 Apr. 2, 2020

(51) Int. Cl.
*A01C 7/20* (2006.01)
*A01C 5/06* (2006.01)

(52) U.S. Cl.
CPC .............. *A01C 7/203* (2013.01); *A01C 5/064* (2013.01); *A01C 5/066* (2013.01)

(58) Field of Classification Search
CPC ......... A01C 7/203; A01C 7/205; A01C 5/064; A01C 5/066
See application file for complete search history.

(56) References Cited

U.S. PATENT DOCUMENTS

| | | | |
|---|---|---|---|
| 4,374,500 | A | 2/1983 | Westerfield |
| 6,164,385 | A | 12/2000 | Buchl |
| 6,701,857 | B1 | 3/2004 | Jensen et al. |
| 7,451,712 | B2 | 11/2008 | Bassett et al. |
| 7,946,232 | B2 | 5/2011 | Patwardhan et al. |
| 8,047,147 | B2 | 11/2011 | Harnetiaux |
| 8,910,582 | B2 | 12/2014 | Mariman et al. |
| 9,357,692 | B2 | 6/2016 | Johnson et al. |
| 9,629,298 | B2 | 4/2017 | Dienst |
| 9,674,998 | B2 | 6/2017 | Dienst |

(Continued)

FOREIGN PATENT DOCUMENTS

WO 2017/197292 A1 11/2017

OTHER PUBLICATIONS

Hanna, Mark, Al-Kaisi, Mahdi, and Tidman, Michael; Check Equipment Callibration Before Planting; Integrated Grop Management; Iowa State University Extension and Outreach; ICM News Archive; Apr. 28, 2003; pp. 1-4; https://crops.extension.iastate.edu/check-equipment-calibration-planting.

(Continued)

*Primary Examiner* — Jamie L McGowan
(74) *Attorney, Agent, or Firm* — Rebecca L. Henkel; Rickard K. DeMille

(57) ABSTRACT

In one aspect, an agricultural planted is associated with an apparatus, a system and/or a method for calibrating a depth control arrangement in each of one or more row units adapted for attachment to a toolbar of the planter, where each row unit has a depth controlling linkage arrangement operatively connected to an adjustable-depth gauge wheel of the row unit. The linkage arrangement includes a load-sensing element that is monitored during adjustment of a calibration mechanism of the linkage arrangement to remove tolerance stack-up in the linkage arrangement and achieve a uniform desired value of the present load on the linkage arrangement of each of the one or more row units that is consistent with a zero-depth or other reference depth setting.

20 Claims, 13 Drawing Sheets

(56) References Cited

U.S. PATENT DOCUMENTS

| | | | |
|---|---|---|---|
| 9,750,174 B2 | 9/2017 | Sauder et al. | |
| 9,848,523 B2* | 12/2017 | Sauder | A01B 63/008 |
| 2011/0313575 A1* | 12/2011 | Kowalchuk | A01C 7/205 |
| | | | 700/282 |
| 2012/0048160 A1* | 3/2012 | Adams | A01C 5/066 |
| | | | 111/163 |
| 2012/0186503 A1* | 7/2012 | Sauder | A01B 63/22 |
| | | | 111/134 |
| 2014/0116735 A1* | 5/2014 | Bassett | A01B 63/008 |
| | | | 172/2 |
| 2015/0271986 A1* | 10/2015 | Sauder | A01B 63/008 |
| | | | 172/2 |
| 2016/0037709 A1* | 2/2016 | Sauder | A01C 5/062 |
| | | | 700/275 |
| 2018/0168094 A1* | 6/2018 | Koch | A01C 7/203 |
| 2018/0263174 A1* | 9/2018 | Hodel | A01C 7/203 |
| 2019/0000004 A1* | 1/2019 | Sloneker | A01B 63/045 |
| 2019/0380259 A1* | 12/2019 | Frank | A01C 5/068 |
| 2020/0037598 A1* | 2/2020 | Wonderlich | A01M 7/0089 |
| 2020/0221632 A1* | 7/2020 | Strnad | A01C 21/00 |
| 2020/0232792 A1* | 7/2020 | Swanson | A01C 5/064 |
| 2020/0375090 A1* | 12/2020 | Morgan | G01N 33/246 |
| 2020/0396897 A1* | 12/2020 | Stoller | A01C 7/203 |

OTHER PUBLICATIONS

Precision Planting LLC; Trading Planters Doesn't Always Make Sense; Ready Row Unit; Precision Seed Spacing & Depth Control; 2018; pp. 1-4; http://www.precisionplanting.com/#products/readyrowunit/.

* cited by examiner

CALIBRATING A DEPTH CONTROL SYSTEM OF A ROW UNIT IN AN AGRICULTURAL PLANTER

FIELD OF THE INVENTION

The present invention pertains to agricultural seed planting implements and to adjusting the operating depth in row units of such implements and, more specifically, to an arrangement for calibrating a depth-setting arrangement in such row units and implements.

BACKGROUND OF THE INVENTION

In modern agriculture, farmers utilize a wide variety of seed planting implements, including seed drills and planters. In some planting implements, seed planting row units are attached to a toolbar extending transverse to the direction of planting. The toolbar is coupled to a tractor or other work vehicle suitable for pulling the planting implement across a field that is to be seeded to a crop. Each row unit includes a ground penetrating arrangement or element, often including one or more discs, for opening a furrow in the ground as the planting implement is pulled across a field. Components of the ground penetrating arrangement shape the bottom and sides of the furrow, and a seed metering device provides individual seeds at a controlled rate for deposit in the furrow. Furrow closing components of each row unit close the furrow in a controlled manner.

It is a desirable and perhaps even primary agronomic principle that seeds should be planted at precisely controlled and consistent depths both within a row and from row to row. Since a single planting implement may be used to plant several different types of crops and/or the same crop in different planting locations under different planting and growing conditions, it is necessary that the planting depth be adjustable so that the seeds are placed at a depth that has been determined to be the best for seed germination and plant growth of the particular crop under the existing and anticipated conditions.

To control planting depth individually for each row, it is known to provide at least one gauge wheel in each row unit that travels on the surface of the field to control the depth to which the ground penetrating arrangement or element of that row unit can penetrate the soil. The positions of the gauge wheel with respect to the ground penetrating arrangement or element are vertically adjustable so that the depth of the furrow can be controlled within fractions of an inch. A depth adjustment arrangement is provided for changing the relative positioning of the gauge wheel with respect to the ground penetrating arrangement or element. It is known to reposition the adjustment linkage by using a handle of a depth selector arrangement that is part of the adjustment arrangement. The handle is typically configured for engaging slots in a register having multiple positions representing various desired depths, to set a given desired depth and secure the handle to maintain the position to which the handle is adjusted.

As growers have gained greater understanding about seed germination and plant growth, and as soil preparation procedures have changed and improved, crop growers have demanded more precise control over seed placement both in the spacing between seeds and in the depth at which the seeds are placed below the soil surface. Accordingly, there is both a demand and a need for even more precise control over the depth of the furrow that is formed during planting operations. While depth-setting mechanisms have been designed for ever more precise settings, the linkages and other structures forming the depth setting arrangement have multiple components and connections which can lead to setting errors due to the variable effects of tolerance stack-up, wear and the like.

Furthermore, in planting implements having multiple row units, it is highly desirable, to achieve uniform emergence of the plants from the soil surface, that all row units be similarly calibrated so that all row units place seed at the same planting depth when set to the same depth settings. The multiple components and linkages present in depth-setting arrangements can exhibit or acquire unacceptably large variations from one row unit to another in the accumulated stack of tolerances in the component parts even when new. And, after wear has occurred and/or if parts have been replaced, planting depths can vary significantly between row units that have been adjusted to the same planting depth settings.

It is desirable, therefore to provide an improved system, apparatus and method for zeroing the depth setting mechanisms in a seed planting implement to adjust out the varying effects of tolerance stack-up and wear in a given row unit, and also between different row units of an implement.

SUMMARY OF THE INVENTION

The invention provides an improved apparatus, system and method for calibrating a depth control arrangement in each of one or more row units adapted for attachment to a toolbar of an agricultural planter, through use of a load-sensing element integrally mounted in the row unit. Where each row unit has a depth controlling linkage arrangement including a force transmitting member and a calibration mechanism operatively connecting a ground penetrating element of the row unit to an adjustable-depth gauge wheel of the row unit, the force transmitting member includes an integrally mounted load-sensing element that is monitored during adjustment of the calibration mechanism to remove tolerance stack-up in the linkage arrangement and achieve a uniform desired value of the present load on the force transmitting member of each of the one or more row units that is consistent with a zero-depth or other reference depth setting.

In one form of the invention, a row unit for an agricultural planter includes a row unit frame adapted for attachment to a tool bar of the agricultural planter, a ground penetrating element such as a disk coulter, an adjustable-depth gauge wheel and a depth control arrangement. The ground penetrating element is operatively connected to the frame and configured for penetrating a ground surface beneath the row unit to a depth of penetration of the ground penetrating element. The depth control arrangement operatively connects the gauge wheel to the frame for selectively regulating the depth of penetration of the ground penetrating element. The depth control arrangement includes a load-sensing element configured and operatively connected within the depth control arrangement for detecting a present value of a load on the depth control arrangement when the ground penetrating element and the gauge wheel are both in contact with the ground surface beneath the row unit. The load-sensing element is further configured for generating an output signal indicative of the present value of the load on the depth control arrangement.

The load-sensing element may include a strain gauge for detecting the present value of a load on the depth control arrangement, and for providing an electrical output signal indicative of the present depth value.

The depth control arrangement may include a force transmitting arrangement operatively connected between the gauge wheel and the frame. The load-sensing element may be operatively configured and connected to the force transmitting arrangement for detecting a present value of a load on the force transmitting arrangement that is representative of the present value of the load on the depth control arrangement.

In some forms of the invention, a force transmitting arrangement may further include a depth selector arrangement operatively disposed between the gauge wheel and the frame and configured for receiving a desired depth input and adjusting the depth of penetration of the gauge wheel according to the received desired depth input. The depth selector arrangement may define a desired depth input setting corresponding to a zero-depth of penetration by the ground penetrating element. The depth control arrangement may further include a calibration arrangement for adjusting the position of the gauge wheel with respect to the ground penetrating element to provide a zero-depth of penetration of the ground penetrating element when the depth selector arrangement is set to a zero-depth of penetration position.

Some forms of a calibration arrangement, according to the invention, may include the load-sensing element.

In some forms of the invention, the load-sensing element may provide an electrical output signal that is indicative of the present load on the depth control arrangement, and the calibration arrangement may include a read-out device that includes a signal processor and a display. The signal processor may be adapted for connection in electrical communication with the load-sensing element for receiving the present load signal from the load-sensing element and providing an output signal indicative of the present load on the depth control arrangement to the display. The display may be configured for providing a visual indication of the present load on the depth control arrangement in accordance with the output signal from the signal processor.

In some forms of the invention, the force transmitting arrangement, may further include a depth control linkage bar arrangement operatively connected between the depth selector arrangement and gauge wheel. The calibration arrangement may include an adjustable calibration bolt. The depth control linkage bar arrangement may include the load-sensing element and the calibration bolt, and it may be configured with the load-sensing element and the calibration bolt in operative connection with one another such that a present load on the depth control linkage bar arrangement as sensed by the load-sensing element is adjustable by turning the calibration bolt.

The invention may also take the form of an agricultural planter having one or more row units according to the invention operatively attached to a tool bar of the planter.

The invention may also take the form of a system for calibrating a depth control arrangement in each of one or more row units adapted for attachment to a toolbar of an agricultural planter, through use of a load-sensing element integrally mounted in the row unit.

The invention may further take the form of a method for calibrating a depth control arrangement of one or more row units adapted for attachment to a toolbar of an agricultural planter, where each row unit has a linkage arrangement including a force transmitting member and a calibration mechanism operatively connecting a ground penetrating element of the row unit to an adjustable-depth gauge wheel of the row unit. Such a method may include measuring a present load on the force transmitting member with a load-sensing element and adjusting the calibration mechanism to achieve a desired value of the present load on the force transmitting member.

Some forms of a method according to the invention may further include placing the ground penetrating element and the gauge wheel in a known positional relationship to one another prior to adjusting the calibration mechanism. The known positional relationship may be a zero-depth position of the ground penetrating element and the gauge wheel.

A method according to the invention may further include simultaneously placing two or more row units of the planter in the zero-depth position and using their respective calibration mechanisms and load-sensing elements to set the respective present loads on the force transmitting members to achieve a uniform desired value of the present load on the force transmitting members of each of the two or more row units.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
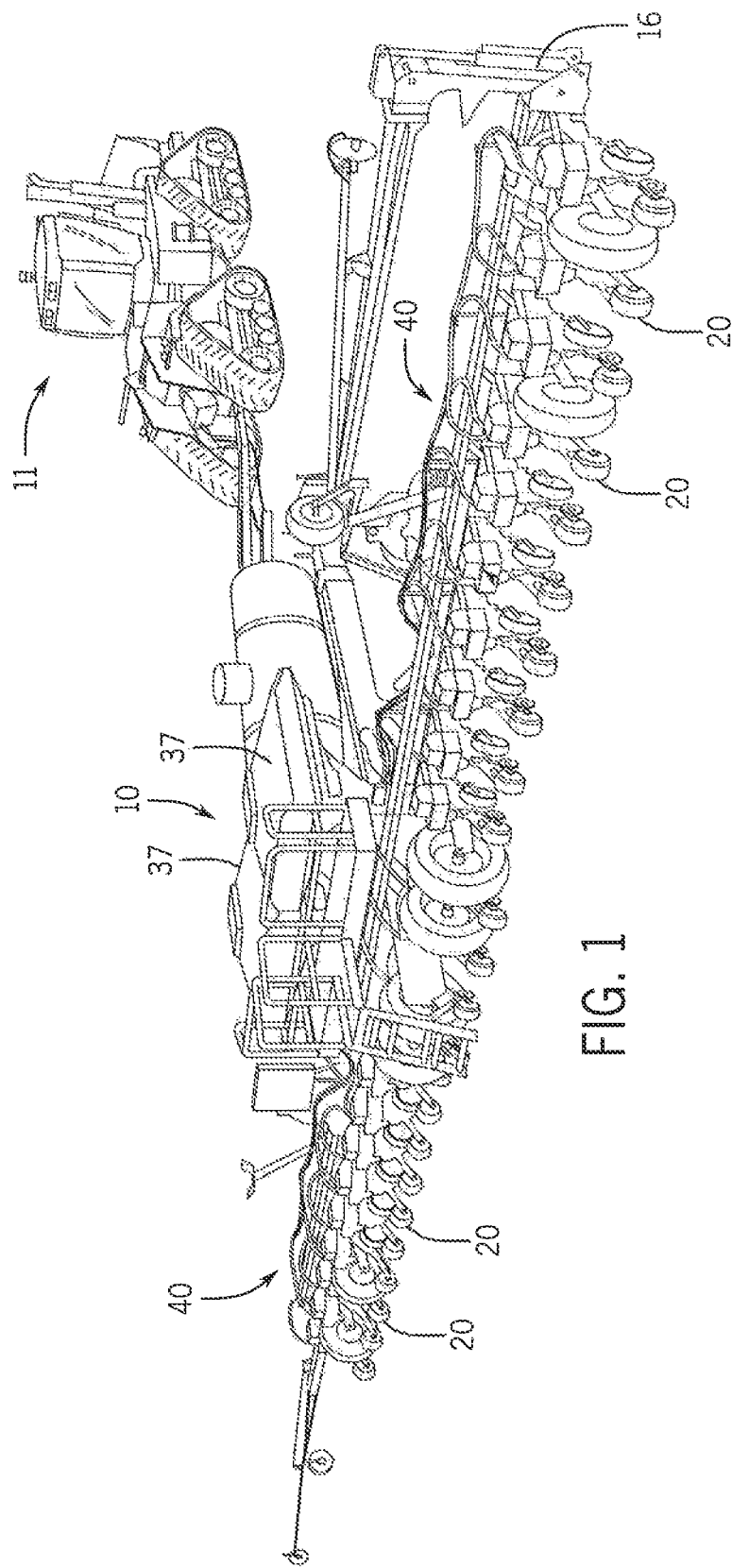
FIG. 1 illustrates an isometric view of an exemplary embodiment of an agricultural planter, according to the invention, being towed behind a tractor, in accordance with an exemplary embodiment of the present invention.

FIG. 1 shows an exemplary embodiment of a seed planting implement, in the form of a multi row planter 10, according to the invention, being towed by a tractor 11.

Figure 2:
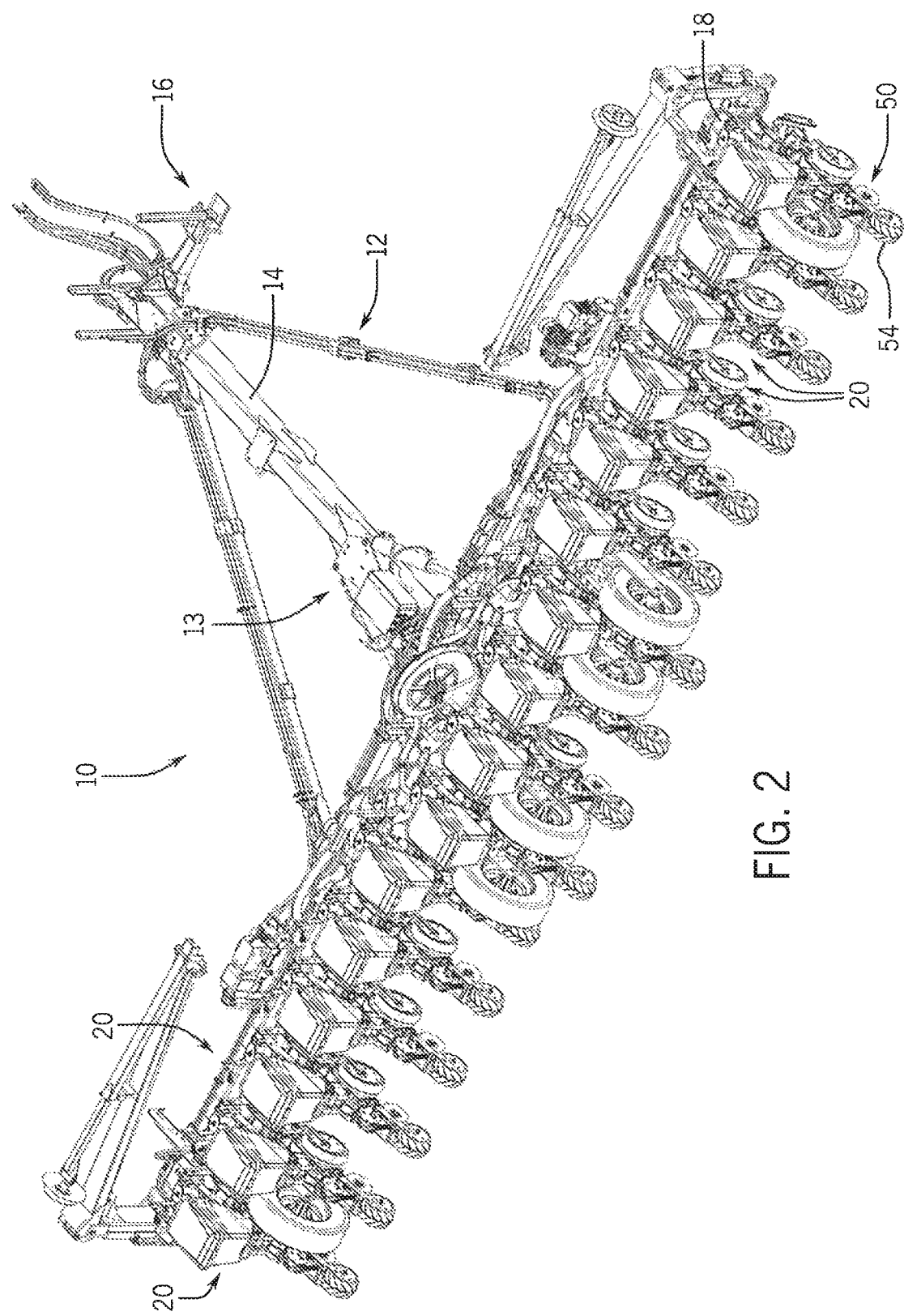
FIG. 2 illustrates an isometric view of a portion of the exemplary embodiment of the planter of FIG. 1, showing a plurality of planter row units attached to a toolbar of the planter, in accordance with an exemplary embodiment of the present invention.

As shown in FIG. 2, the planter 10 has a frame 12 that includes a tow bar arrangement 13 having a tow bar 14, a hitch 16, and a toolbar 18. The hitch 16 is adapted for coupling the planter 10 to a drawbar of the tractor 11 for pulling the planter 10 through a field. The toolbar 18 extends generally transversely to tow bar 14 and is thus generally also oriented transversely to the planter 10 as it is being towed during planting operations.

A plurality of seed planting row units 20 are connected to toolbar 18 in a side-by-side relationship, with each of the row units 20 generally being substantially identical to the others. In the exemplary embodiment of the planter shown in FIG. 1, the planter 10 includes thirty-six row units 20, only some of which are identified with reference numbers. For clarity of illustration, FIG. 2 shows only sixteen of the planting units 20. It will be understood, by those having skill in the art, however, that more or fewer row units 20 can be provided in other embodiments of the invention.

Referring now primarily to FIG. 3 through FIG. 6, each row unit 20 includes a frame 22 that is connected to toolbar 18 by upper arms 24 and lower arms 26, each arm 24, 26 being connected to frame 22 and to toolbar 18. Accordingly, each row unit 20 extends rearward from toolbar 18 to plant a row of seeds as seed planting implement 10 is towed across a field. The individual planting units 20 are spaced along toolbar 18 to provide planted seed rows of a desired spacing. During a planting operation, forward movement of seed planting implement 10 causes each row unit 20 to form a seed furrow, deposit precisely spaced seeds in the furrow and close furrow over the seeds deposited in the furrow.

Each row unit 20 includes a ground penetrating or furrow opening arrangement 30 (FIG. 3) having ground penetrating elements in the form of a pair of disks 32 that converge forwardly and downwardly to open a furrow or seed trench as seed planting implement 10 moves forward. A seed metering system 34 receives seeds from a row unit seed hopper 36, or from a common seed hopper 37 of the planter 10 as shown in FIG. 1, and it provides individual seeds at a controlled rate to a seed tube 38 for deposit in the bottom of the furrow formed. Air-driven seed transport and vacuum systems, as indicated generally at 40 in FIG. 1, provide vacuum and air to the row units for metering the rate of delivery of seeds to seed tube 38.

Figure 3:
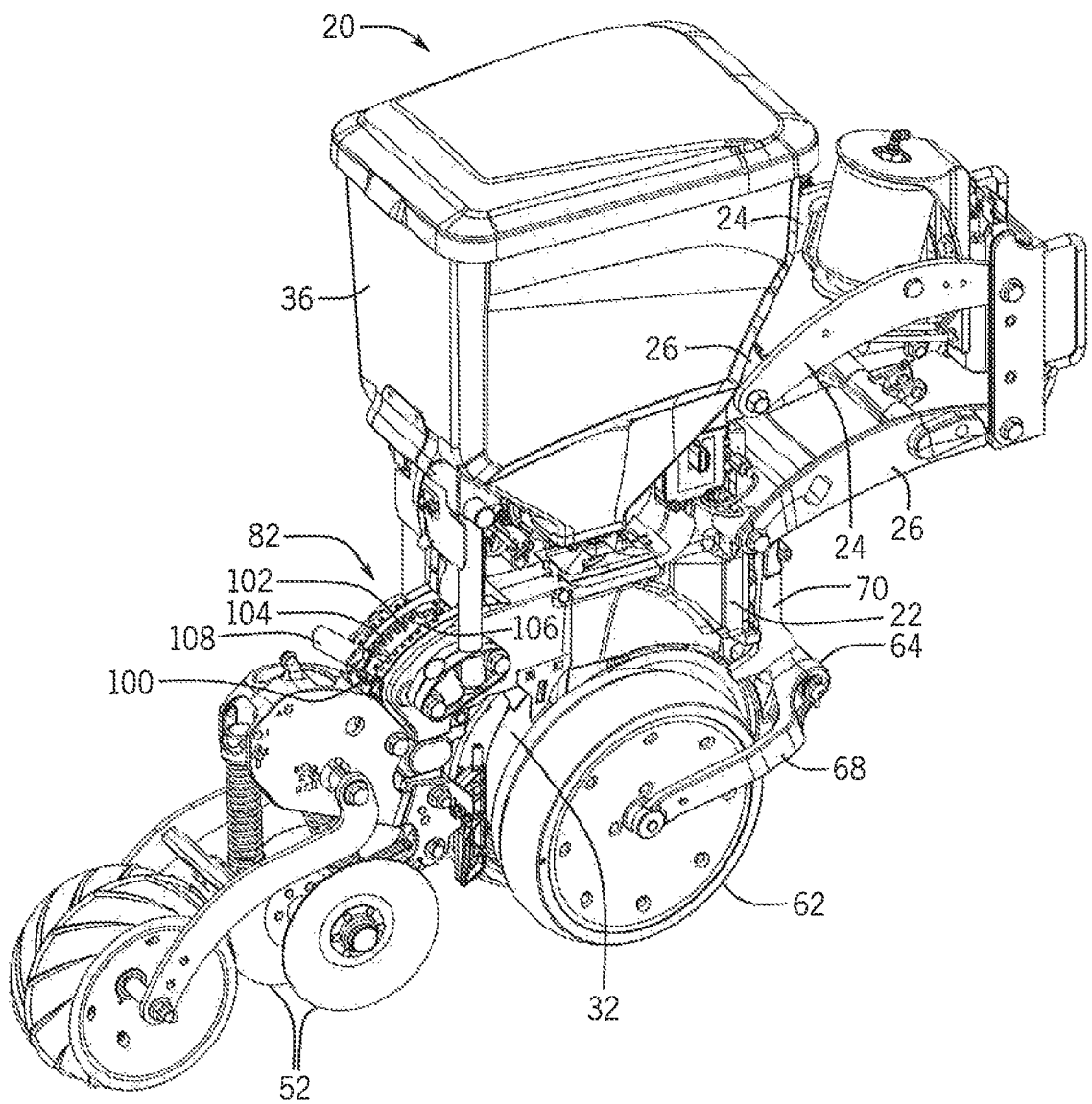
FIG. 3 illustrates an isometric view of one of the row units of the exemplary embodiments of the planter of FIG. 1, in accordance with an exemplary embodiment of the present invention.

As shown in FIGS. 2 and 3, a furrow closing mechanism 50 at the trailing end of each row unit 20 closes the furrow after the seeds have been deposited in the furrow. Furrow closing mechanism 50 includes a pair of closing wheels 52 (FIG. 3) that operate on opposite sides of the furrow to move soil back into the furrow and over the seeds deposited in the bottom of the furrow. A trailing packer wheel 54 (FIG. 2) travels along the top of the furrow and firms the soil replaced in the furrow to eliminate air pockets and ensure good seed-to-soil contact.

Figure 4:
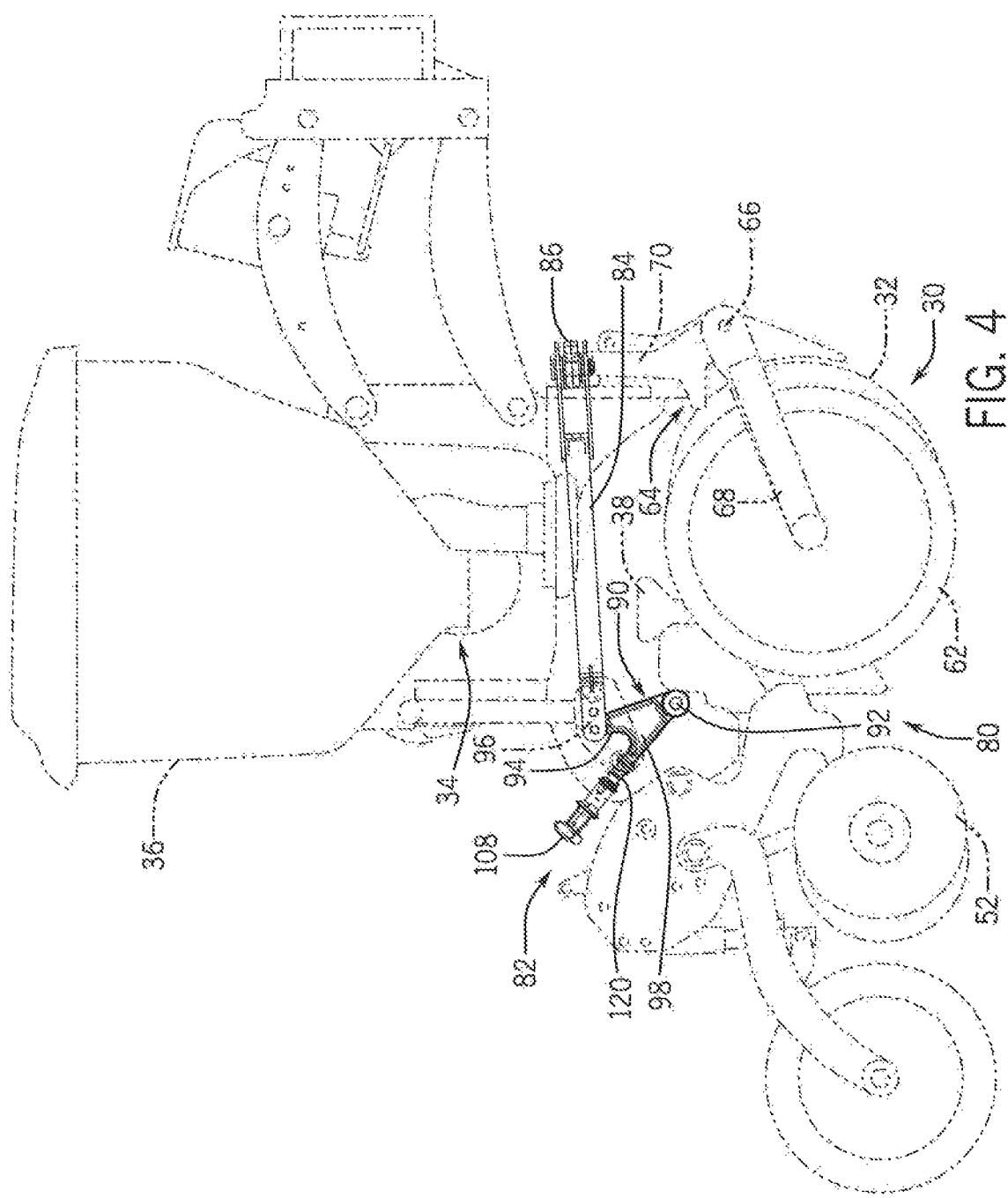
FIG. 4 illustrates a side view of the row unit shown in FIG. 3, in accordance with an exemplary embodiment of the present invention.
Figure 5:
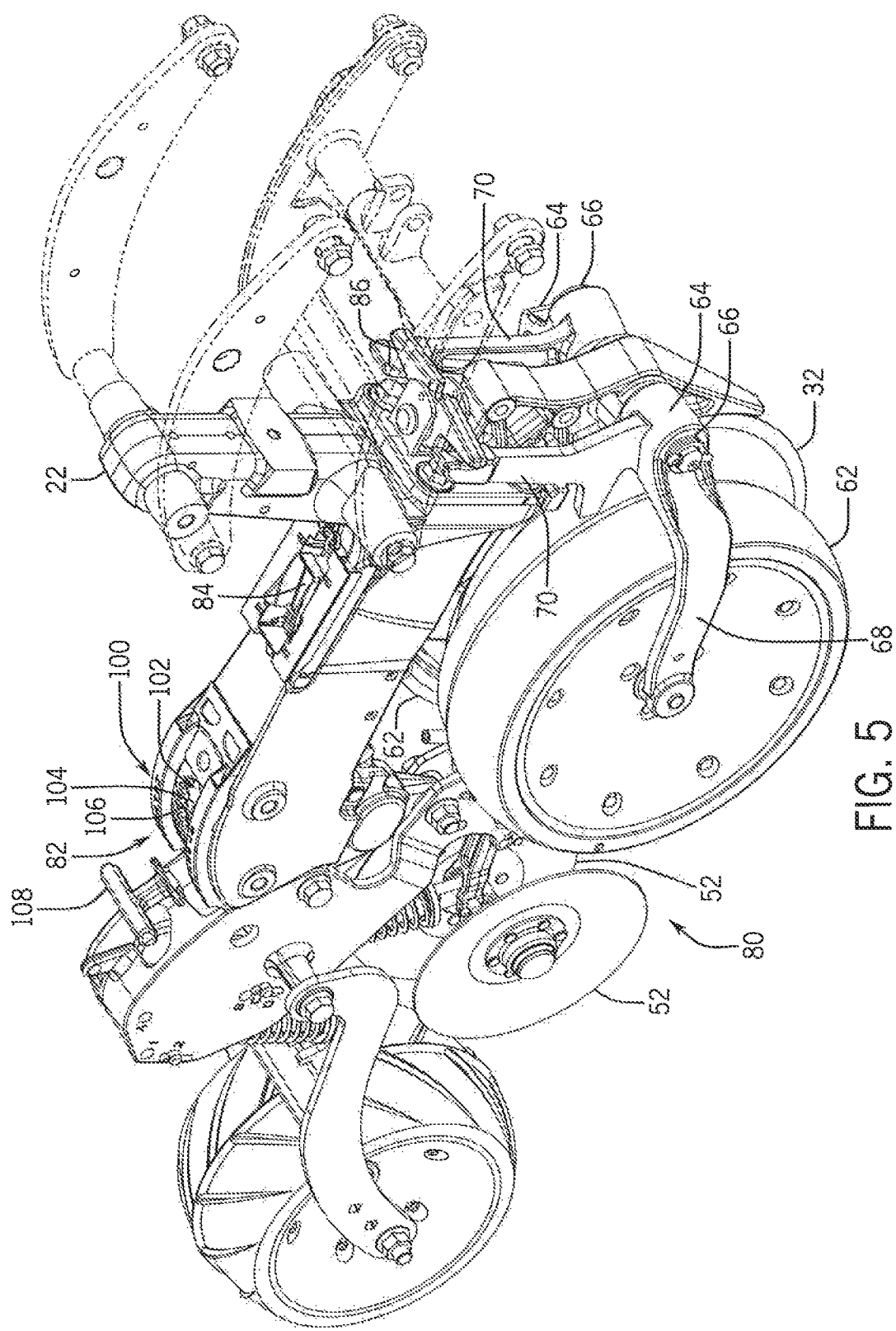
FIG. 5 illustrates another isometric view of the row unit, showing the row unit from an angle different from the angle shown in the isometric view of FIG. 3, in accordance with an exemplary embodiment of the present invention.
Figure 6:
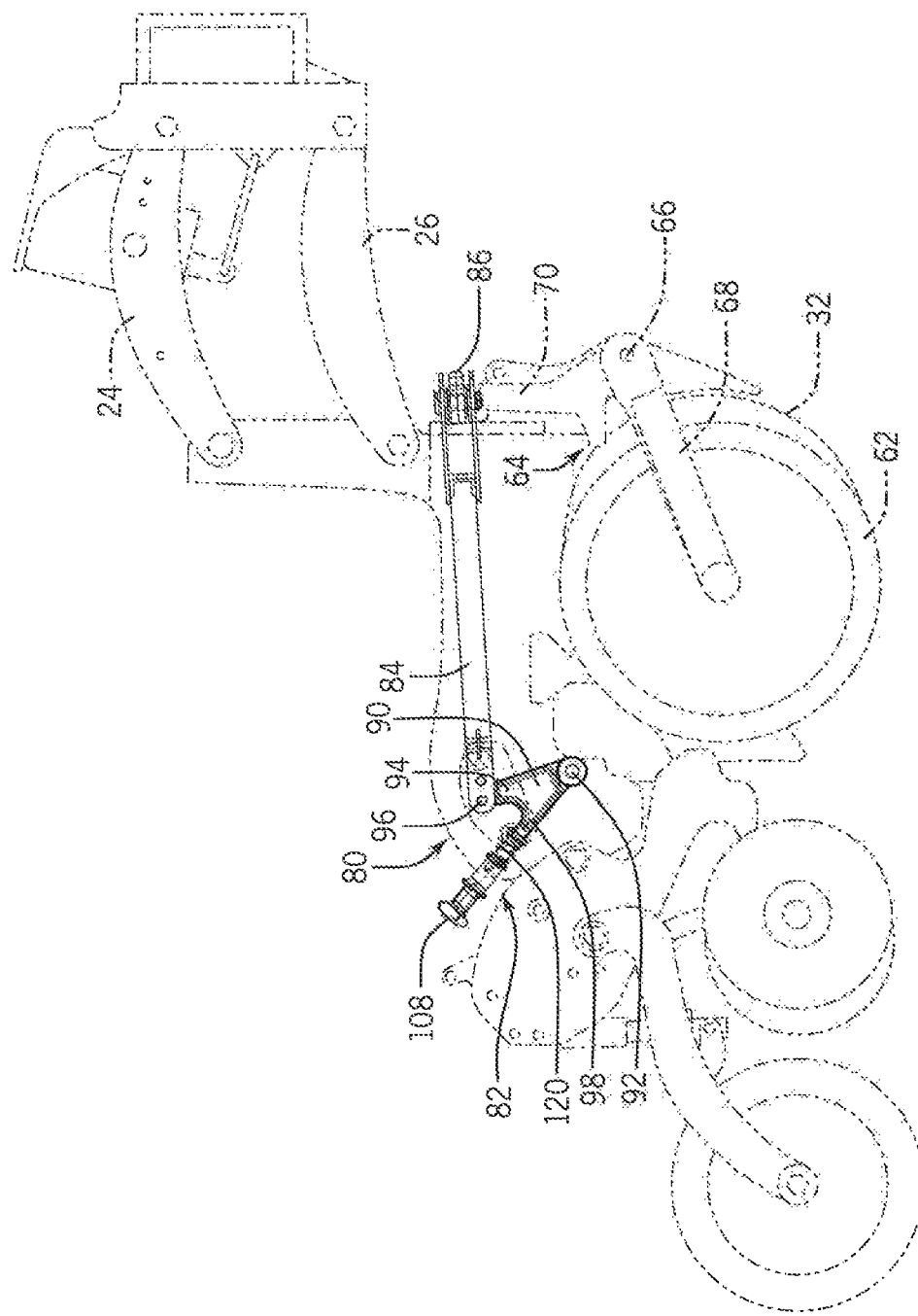
FIG. 6 illustrates a fragmentary side view of the row unit of FIG. 4, with some component parts of the row unit not shown for clarity of illustration, illustrating inner components of the row unit used for depth setting, in accordance with an exemplary embodiment of the present invention.

As shown in FIGS. 4 and 5, the depth to which opening discs 32 are allowed to penetrate the ground is controlled by a depth control arrangement 80 that includes: a pair of gauge wheels 62 each connected to the row unit frame 22 by a respective gauge wheel trailing-arm suspension crank arrangement 64; a depth selector arrangement 82; a two-piece, adjustable-length depth control linkage bar arrangement 84; a wobble bracket 86; and associated connecting hardware for providing pivotal connections between the various parts 62,64,82,84,86 of the depth control arrangement 80.

One of the gauge wheels 62 is located adjacent each opening disc 32. Each gauge wheel 62 is rotatably mounted on a respective one of the gauge wheel suspension cranks 64 that are in turn pivotally connected at a pivotal attachment 66 to row unit frame 22. Each gauge wheel suspension crank 64 has a trailing arm 68 extending generally rearward from pivotal attachment 66 and a depth control arm 70 extending generally upward from pivotal attachment 66. By virtue of this configuration, pivotal movement of gauge wheel arm 64 about pivotal attachment 66 to frame 22 changes the relative height position of gauge wheel 62.

The pivoted positions of the gauge wheel cranks 64 in the exemplary embodiment are controlled in unison with one another by the depth control arrangement 80, in a manner described in more detail below. Utilizing the depth control arrangement 80 to simultaneously raise the gauge wheels 62 allows opening discs 32 to penetrate deeper into the ground. Conversely, utilizing the depth control arrangement 80 to simultaneously lower the gauge wheels 62 reduces the depth to which discs 32 can penetrate into the ground. Movement and positioning of the gauge wheel cranks 64 are accomplished through use of the depth selector arrangement 82.

Referring now primarily to FIG. 3 through FIG. 7, the depth control arrangement 80 includes a depth selector arrangement 82 that includes a V-shaped pivot arm 90 having a movable handle 108 that engages a depth selecting register 100 to set a desired depth of penetration of the disks 32.

As best seen in FIG. 4, the V-shaped pivot arm 90 has a pivotal connection 92 to row unit frame 22 at the vertex of the V-shaped pivot arm 90. A forward leg 94 of pivot arm 90 has a pivotal connection 96 to a rear end of the depth control linkage bar 84. A rear leg 98 of pivot arm 90 extends through a slot 102 in the depth setting register 100. The slot 102 defines a first row of notches 104 along one side of slot 102 and a second row of notches 106 along an opposite side of slot 102. Opposed pairs of notches including one of the notches 104 and one of the notches 106 define detented locations for securing the position of the handle 108 and pivot arm 90 at a selected desired depth position.

The handle 108 is slidingly attached to the distal end of rear leg 98 of the pivot arm 90 and includes laterally projecting position holding pegs 110,112 for engaging matching pairs of the notches 104,106 in the slot 102 of register 100. The pairs of notches 104,106 secure the position of pivot arm 90 by receiving and engaging the pegs 110,112 extending from the handle 108. A spring 114 biases the handle 108 outward for maintaining the pegs 110,112 of the handle 108 in the notches 104,106 for maintaining a selected position of the handle 108 in the depth selection register 100. Sliding the handle 108 inward on the rear leg 98 against the force of the spring 114 disengages the pegs 110, 112 from the notches 104,106 and allows the handle 108 to be moved fore or aft in slot 102 to align pegs 110,112 with different pairs of notches 104,106. As the handle 108 rebounds outwardly under the force of the spring 114, the pegs 110,112 of the handle 108 reengage with a pair of notches 104,106 to lock the handle 108 and depth control arrangement 80 at the selected desired depth setting.

Fore and aft movement of the handle 108 of the depth selector arrangement 82 rotates the pivot arm 90 about its pivotal connection 92, and thereby moves the depth control linkage bar arrangement 84 fore and aft in a corresponding fashion, to alter the fore/aft position of wobble bracket 86 that is attached to a forward end the depth control linkage bar arrangement 84 and bears against the control arms 70 of the gauge wheel cranks 64. The fore/aft position of the wobble bracket 86 in turn simultaneously controls the position of the two depth control arms 70 of the gauge wheel cranks 64 to raise or lower the height of gauge wheels 62 and thereby adjust the depth of penetration of the disks 32.

Figure 7:
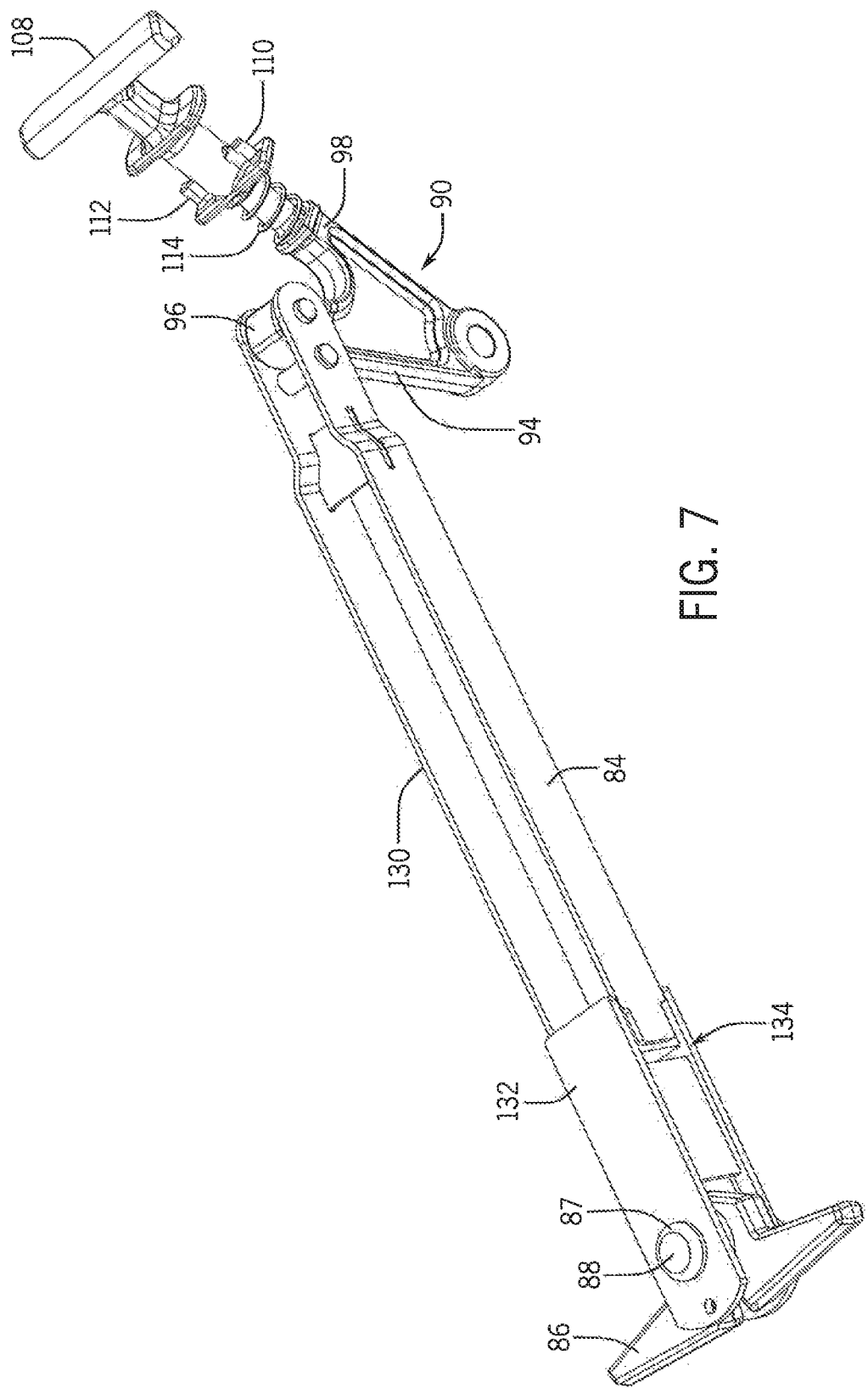
FIG. 7 illustrates an isometric view a first exemplary embodiment of a depth setting linkage arrangement in the row unit, in accordance with an exemplary embodiment of the present invention.

As best seen in FIG. 7 the two-piece, adjustable length depth control linkage bar arrangement 84 includes a rear link 130 that is connected to forward leg 94 of the pivot arm 90 at pivotal connection 96, and a forward link 132 that is connected to wobble bracket 86 by a pin 87 at a pivotal connection 88. The rear and forward links 130,132 of the control linkage bar arrangement 84 are configured to from an axially adjustable interconnection 134 so that the overall length of linkage bar 84 is selectively variable for calibrating the depth control arrangement 80. The rear and forward links 130,132 of the depth control linkage bar arrangement 84 are configured to partly telescopically engage with one another to allow for axial adjustability of the adjustable interconnection 134 to change the overall length of linkage bar 84.

Figure 8:
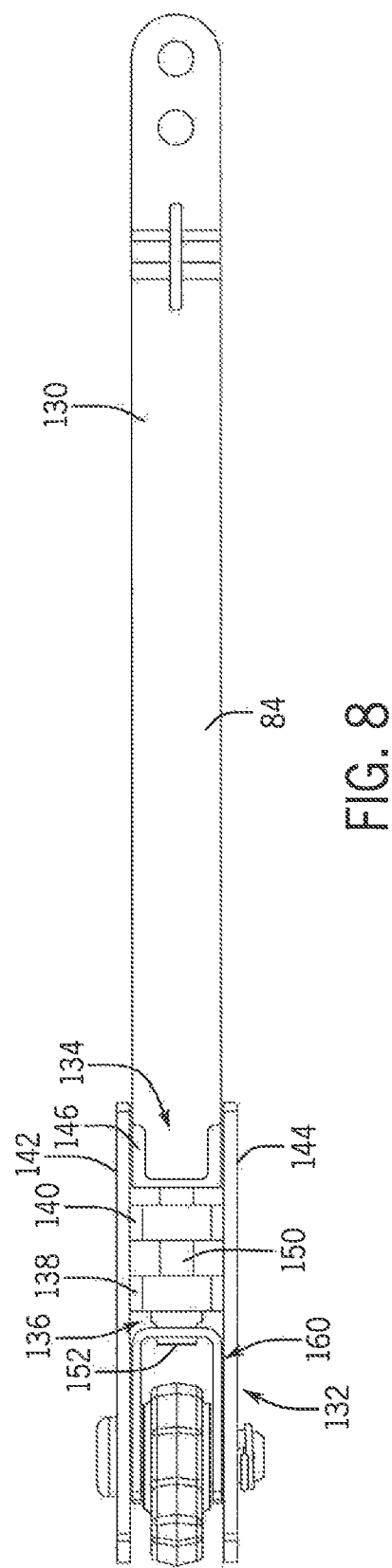
FIG. 8 illustrates a side view of the depth linkage assembly of FIG. 7, in accordance with an exemplary embodiment of the present invention.

As shown in FIG. 8, the adjustable interconnection 134 in the depth control linkage bar 84 includes a calibration bolt 136 extending through clearance through-holes in blocks 138,140 fixed between side plates 142,144 of the forward link 132 and received by threaded engagement in a threaded block 146 affixed to the front end of the rearward link 130 of the linkage bar 84. The side plates 142,144 and the location of the fixed blocks 138,140 form a rear-facing receptacle in the forward link 132 for slidingly receiving the forward end of the rear link 130 of the depth control linkage bar 84.

Figure 9:
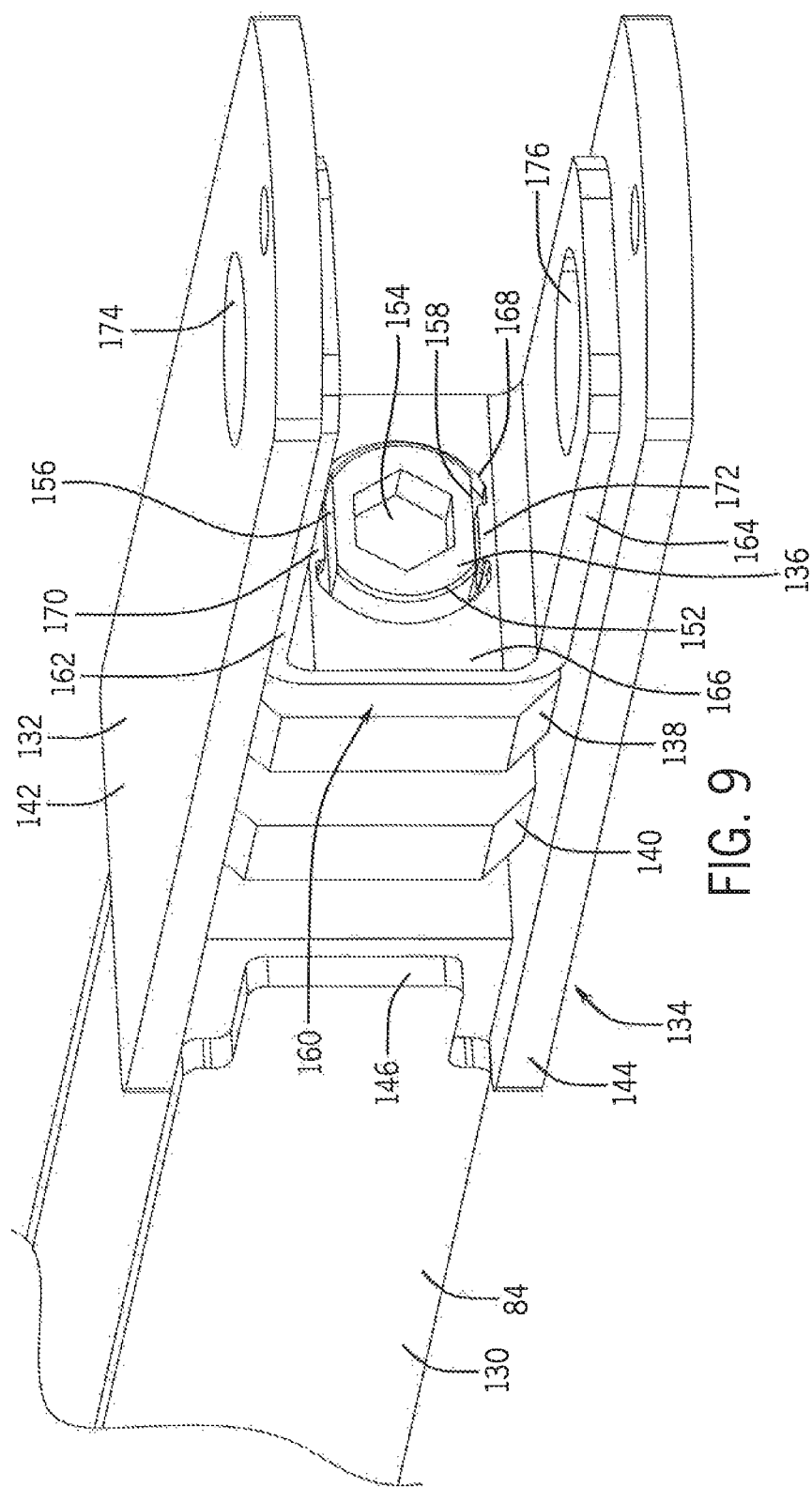
FIG. 9 illustrates an isometric view of a locking shim installed in the linkage arrangement following calibration, to maintain the calibration adjustment, in accordance with an exemplary embodiment of the present invention.
Figure 10:
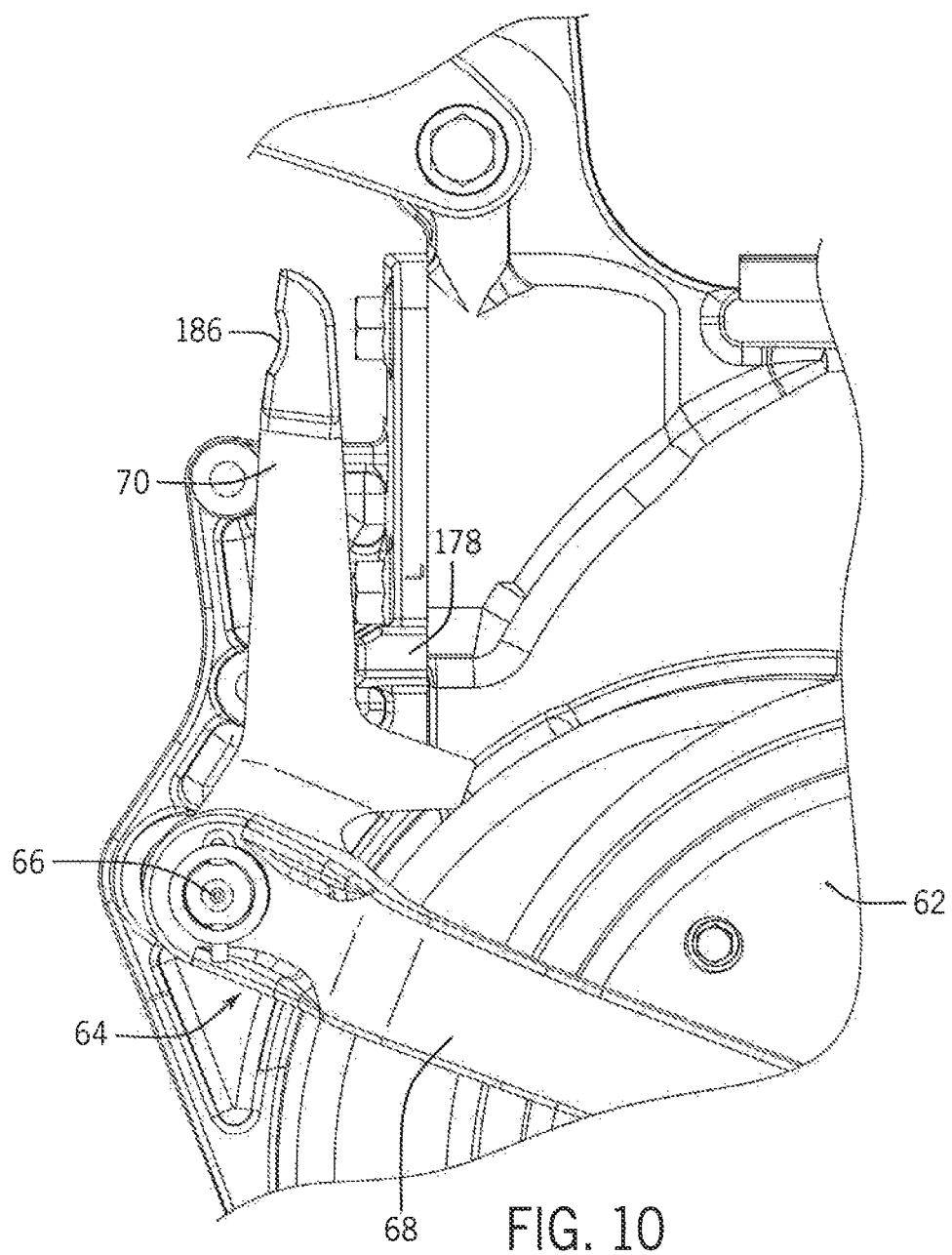
FIG. 10 illustrates a fragmentary elevation view of the row unit showing a zero-depth stop arrangement, in accordance with an exemplary embodiment of the present invention.

As shown in FIGS. 8 and 9, the calibration bolt 136 includes a shank 150 that is threaded along at least a portion of an end thereof, and a head 152 having a drive configuration 154 formed therein for engagement by an appropriate tool for rotating the bolt 136. In the exemplary embodiment shown, drive configuration 154 is an internal hexagonal depression for receiving a hex key (Allen wrench) in rotational drive engagement. It should be understood that drive configuration 154 can be of other shaped depressions in head 152 to engage other internally received drive tools, or drive configuration 154 can be an external shape of head 152 to receive a wrench, drive socket or the like. Head 152 includes opposed external flats 156, 158 that also can receive a wrench, drive socket or the like. Advancing the threaded engagement of bolt 136 into threaded block 146 decreases the overall length of depth control linkage bar 84 by drawing the rear and forward links 130,132 closer together. Retracting the threaded engagement of bolt 136 from threaded block 146 allows the rear and forward links 130,132 to move farther apart, thereby increasing the overall length of depth control linkage bar 84.

Referring now particularly to FIG. 9, a lock mechanism in the form of a locking shim, bracket or cage 160 is provided to secure the position to which bolt 136 has been adjusted. Cage 160 is generally U-shaped and has sides 162,164 joined by a bight 166. Bight 166 has a specially shaped hole 168 therein including opposed flats 170,172 to receive and engage flats 156,158 of the head 152 against flats 170,172 of shaped hole 168 to prevent further rotation of bolt 136. The sides 162,164 of cage 160 are received inside and against side plates 142,144. The side plates 142,144 define aligned through-holes 174,176 for receiving the pin 87 forming the pivotal connection 88 between the forward end of the depth control linkage bar arrangement 84 and the wobble bracket 86. The through-holes 174,176 in the side plates 142,144 are sized to provide a close, slip-fit with the pin 87, and thus serve to locate the pivotal connection 88 in the fore/aft direction. The sides 162,164 define slot-shaped, clearance through-holes that are slightly elongated in the fore/aft direction to allow for proper locking engagement with the head 152 of the calibration bolt 136. It should be understood that locking structures other than the cage 160 can be used for preventing the unintended rotation of bolt 136 after the adjustment thereof in other embodiments of the invention.

Zero adjustment or calibration of depth control arrangement 80 is performed upon initial assembly and can be performed again from time to time as a maintenance procedure. For example, it may be desirable to zero adjust the system after significant wear and/or when replacement parts have been installed. Zero adjustment is performed with wobble bracket 86, pivotal connection 88 and cage 160 not yet installed (during initial assembly) or removed (when performed as a maintenance step).

To perform such a zero calibration, the planter 10 is initially operated to raise the toolbar 18 and lift all of the row units 20 free of the ground. As illustrated in FIG. 8, each gauge wheel 62 drops, pivoting its respective gauge wheel arm 64 about the pivotal attachment 66 thereof until the control arms 70 contact a frame stop 178 attached to the row unit frame 22. This allows removal of wobble bracket 86, pin 87 of the pivotal connection 88 and cage 160 when performed as a maintenance operation or the insertion of depth control linkage arm 84 during assembly.

With seed planting implement 10 thus prepared, toolbar 18 is lowered until opening discs 32 barely contact a flat level surface upon which implement 10 is positioned. Opening discs 32 thereby rest at a zero-penetration setting, and the depth selector arrangement 82 of the depth control arrangement 80 can be adjusted for proper registration of handle 108 at the zero-penetration setting of the depth setting register 100. The handle 108 is positioned and engaged with the appropriate notches 104,106 for a zero-penetration setting. Bolt 136 is then adjusted relative to threaded block 146 to advance further into or to withdraw further from threaded block 146, while at all times remaining threadedly engaged therewith. In this way, the overall length of depth control linkage bar 84 is adjusted so that when wobble bracket 86 is re-attached thereto it will properly engage control segments 70 of gauge wheel arms 64 and without unacceptable looseness.

It should be understood that the appropriate length for depth control linkage bar 84 can be determined in numerous ways, including measurement between the end thereof and a fixed point such as, for example, a feature of the depth setting register 100 or another fixed point of reference.

Figure 11:
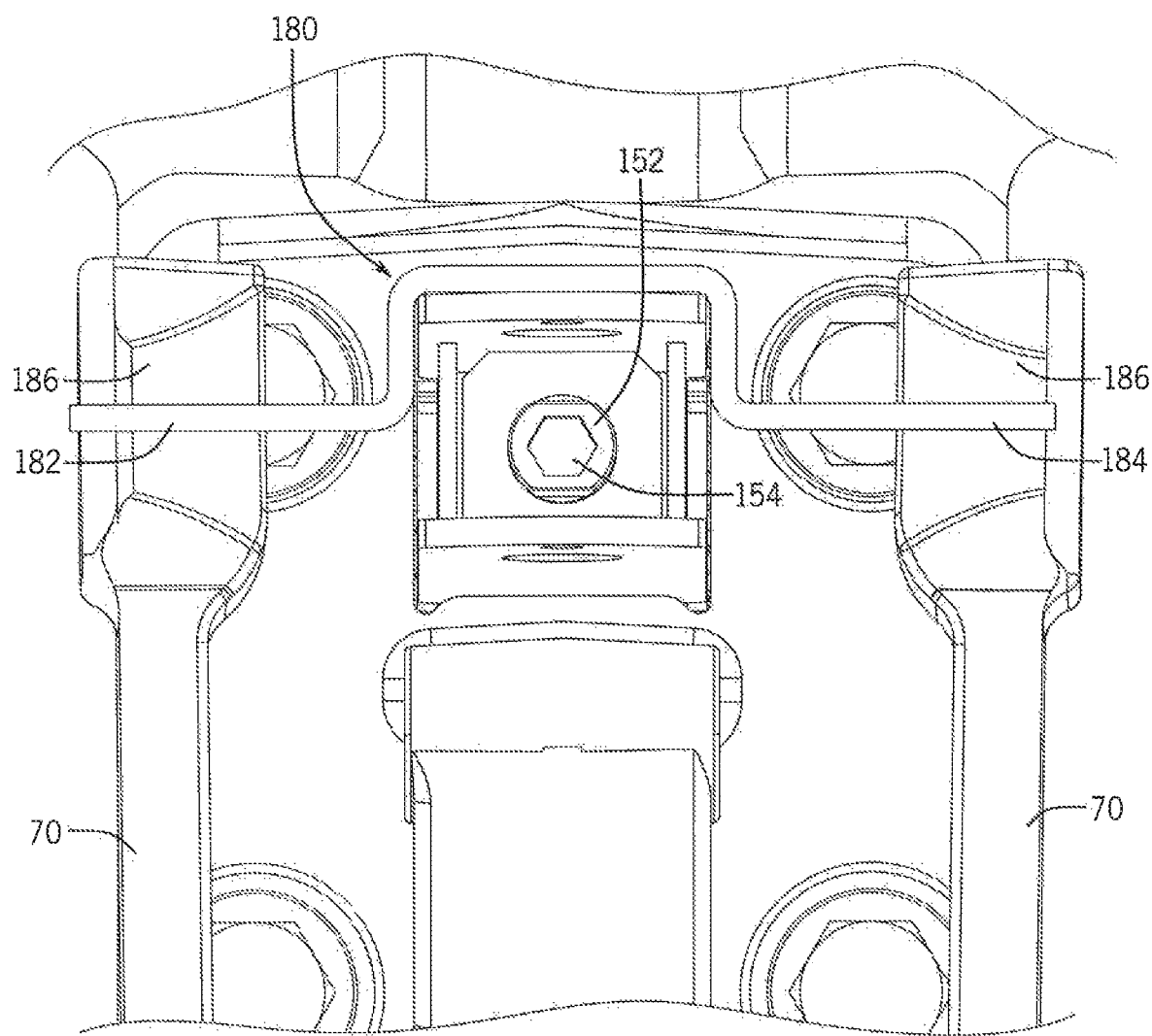
FIG. 11 illustrates a cross-sectional view of a portion of the row unit illustrating the manner in which a calibration gauge may be used for calibrating the depth control arrangement, in accordance with an exemplary embodiment of the present invention.

A convenient way for determining the proper overall length of linkage arm 84 is by the use of a gauge 180. As illustrated in FIG. 11, an exemplary embodiment of an appropriate gauge 180 includes wings 182, 184 to be simultaneously received in wobble bracket slots 186 of the depth control arms 70 of both of the gauge wheel cranks 64. With the control arms 70 resting against their respective stops 178, the handle 108 at the zero-depth position in the register 100, and the gauge 180 in place in the wobble bracket slots 186 of the control arms, the calibration bolt 136 is rotated so as to advance further into, or withdraw further from threaded block 146 and thereby change the overall length of depth control linkage bar 84 until the outer end of control linkage bar 84 is received at a designated position relative to gauge 180. Bolt head 152 is adjusted as necessary so that flats 156,158 thereof are properly positioned such that cage 160 can be installed with shaped hole 168 thereof engaging bolt head 152, with flats 156, 158 of bolt head 152 disposed against flats 170,172 in shaped hole 168 of cage 160. Gauge 180 is removed, and cage 160 is installed.

Once the calibration of each row unit 20 is completed, its respective wobble bracket 86 and pin 87 are installed to make the pivotal connection 88, thereby securing cage 160 in position and locking bolt 136 against unintended rotation.

When all row units 20 of seed planting implement 10 are adjusted in this manner to a common zero-depth of penetration setting, each will have a common elevation relative to the zero setting to which it was adjusted. Each can then be set so that the opening discs 32 thereof will penetrate a same depth into the ground if the handles 108 of the depth selectors 82 thereof are adjusted to similar settings in registers 100. In that way, all row units 20 that are set to the same settings will deposit seeds at the same depths below the surface of the ground.

Figure 12:
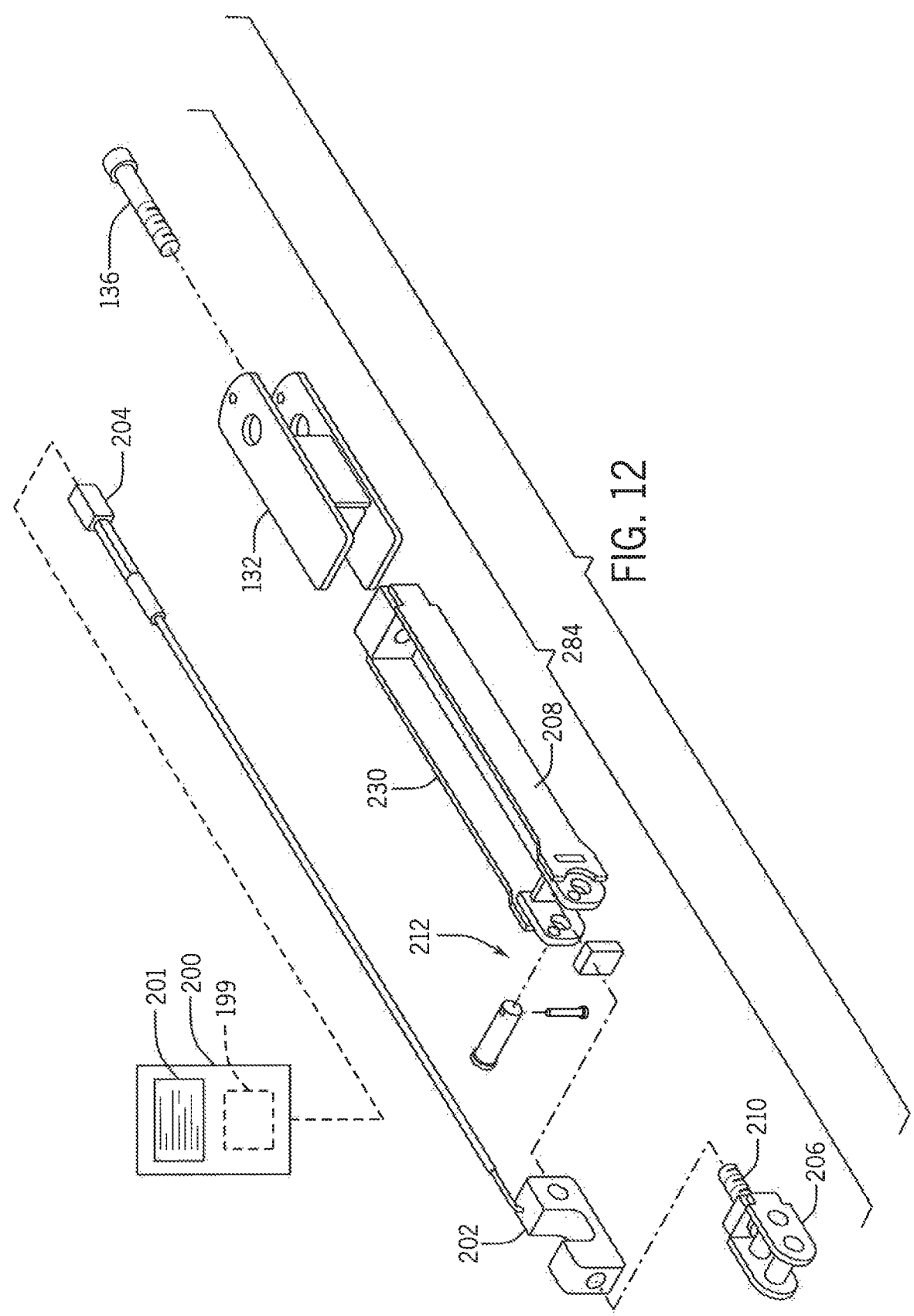
FIG. 12 illustrates an exploded isometric illustration of an alternate exemplary embodiment of an adjustable-length depth control linkage bar arrangement having an integral load-sensing element that may be used in place of the non-load-sensing, adjustable-length, depth control linkage bar arrangement shown in the exemplary embodiment of FIGS. 7 and 8, in accordance with an exemplary embodiment of the present invention.

FIG. 12 illustrates an alternate embodiment of a three-piece, adjustable length depth control linkage bar arrangement 284 that can be used in place of the two-piece depth control linkage bar arrangement 84 described above, to facilitate calibration of a depth control arrangement 280 in the row units 20 of the exemplary embodiment of the planter 10.

In the alternate embodiment, the rear end of the rear link 230 of the three-piece, adjustable length depth control linkage bar arrangement 284 is adapted to accommodate the attachment of a load-sensing link 202 that includes a strain gauge for sensing a present axial load exerted on the depth control linkage bar arrangement 84 and generating an output signal at a connector 204 that is indicative of the sensed present axial load. The output signal from the load-sensing link 202 can be used in a variety of ways to further facilitate calibration of the depth control arrangements 80 of the row units 20, and it can provide greater precision than is achievable with measurements or through the use of a gauge 180 in the manner described above for row units 20 that do not include the load-sensing element 202.

As shown in FIG. 12, the rear link 230 of the alternate embodiment of the depth control linkage bar arrangement 284 is divided into a first segment 206 that is adapted for attachment at the pivotal connection 96 to the forward leg 94 of the pivot arm 90 of the depth selection arrangement 82, and a second segment 208 that is adapted for attachment to the forward link 132 via the axially adjustable interconnection 134 and calibration bolt 136 in the same manner as described above for the two-piece embodiment of the depth control linkage bar arrangement 84 that did not include the load-sensing element 202. The first and second segments 206,208 of the rear link 230 of the three-piece depth control linkage bar arrangement 284 are joined together by attaching the load-sensing link 202 to the first segment by a threaded stud 210 extending axially forward from the first segment 206, and a clevis pin arrangement at the rear end of the second segment 208. Connected in this manner, axial loads applied to the rear link 230 will cause the strain gauge in the load-sensing link 202 to generate a signal that is indicative of the present axial load on the rear link 230, that can be read by a read-out device 200, such as a meter or control unit, connected in electrical communication with the connector 204.

The read-out device 200 may include a signal processor 199 and a display 201. The signal processor 199 may be adapted for connection, via the connector 204, in electrical communication with the load-sensing element 202 for receiving the present load signal from the load-sensing element 202 and for providing an output signal indicative of the present load on the depth control arrangement 80 to the display 201. The display 201 may be configured for providing a visual indication of the present load on the depth control arrangement 80 in accordance with the output signal from the signal processor 199.

By setting the axial loads in the rear links 230 of all of the row units 20 to the same value, with their respective depth selectors 84 set at zero-depth, and their respective gauge wheels 62 and disks 32 all simultaneously resting on the flat surface under the planter 10, the zero-depth positions of all of the row units 20 can be conveniently calibrated and matched to one another in a manner that provides increased precision and is less complicated than the calibration procedures utilizing measurements to a fixed point or use of the gauge 160 required in embodiments without the load-sensing element 202.

Figure 13:
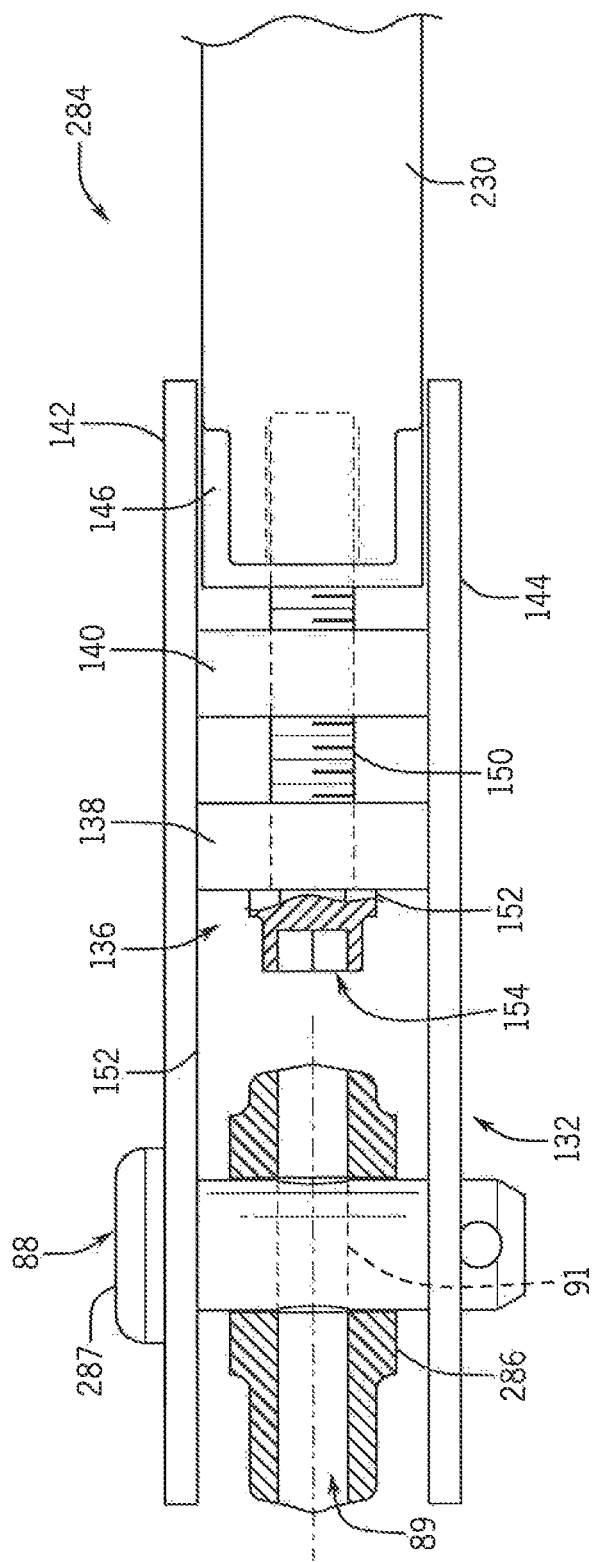
FIG. 13 illustrates a partial section view showing a preferred embodiment of components of the depth control arrangement attached to the alternate exemplary embodiment of the adjustable-length depth control linkage bar arrangement shown in FIG. 12, in accordance with an exemplary embodiment of the present invention.

As shown in FIG. 13, in a preferred embodiment of the invention having a load-sensing element 202, the wobbler bracket 286 and the connection pin 287 used to connect the wobbler bracket 286 to the forward link 132 of the three-piece depth control linkage bar arrangement 284 include axially oriented through-holes 89,91 to allow passage of a tool, such as an internal hex drive wrench, through the holes 89,91 in the wobbler bracket 286 and the connection pin 287 for turning the head 152 of the calibration bolt with the wobbler bracket 286 and the connection pin 287 installed.

With such a preferred embodiment, calibration is accomplished by first removing the locking cages 160 from all of the planter units 20 and reinstalling their respective wobbler brackets 286 and connection pins 287 with the through holes 89,91 aligned to allow access to the heads 152 of the calibration bolts 136.

With the handles 108 of their respective depth selectors 82 set at zero-depth, and their respective gauge wheels 62 and disks 32 all simultaneously resting on the flat surface under the planter 10, the calibration bolts 136 are then tightened to draw the wobbler bracket 286 of each row unit into contact with the slots 186 depth control arms 70 of its respective gauge wheel arms 64. The calibration bolts 136 are then further tightened to pull the control arms 70 of the gauge wheel cranks into contact with their respective zero-depth stops 178.

The calibration bolt 136 of each of the row units 20 is then yet further tightened while the present load signal from the load-sensing link 202 in that row unit 20 is monitored by the read-out device 200, and all row units 20 are set to the same axial load. The locking cages 160 are then re-installed in each row unit 20 to lock the calibration bolts 136 in place, with care being taken to keep the particular wobble bracket 86 and connection pin 87 used for calibrating a given row unit 20 matched to that particular row unit 20.

Those having skill in the art will appreciate that using the load-sensing links 202 in the manner described above for the preferred embodiment having through holes 89,91 in the wobbler brackets 286 and connecting pins 287 allows all tolerance stack-ups in the entire depth control arrangement 80 to be compensated for during calibration of the row units 20 of the planter 10.

It is contemplated that the various individual features of the various exemplary embodiments described above may be used with efficacy in various combinations other than those specifically described herein within the scope of the invention.

For example, in embodiments of the invention having a load-sensing element 202, it is contemplated that a standardized axial-loading fixture may be utilized during calibration, in place of a gauge 180 or the wobble bracket 286 and connecting pin 287, to allow the calibration bolt 136 to be adjusted to a uniform load as measured by the load-sensing link 202 for taking up tolerances in the depth control arrangement 80.

It is further contemplated that, in other embodiments of the invention, an adjustable calibration arrangement and/or a load-sensing element may be located elsewhere in the depth control arrangement 80, such as in the trailing or depth control arms 68,70 of the gauge wheel cranks 64, the depth selector arrangement 82, or in the various pivotal connections 66,88, 92, or in the intra-link connection 134.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but it is intended to include all changes and modifications that are within the scope and spirit of the invention.

What is claimed is:

1. A row unit for an agricultural planter, the row unit comprising:
a row unit frame adapted for attachment to a tool bar of the agricultural planter;
a ground penetrating element operatively connected to the frame and configured for penetrating a ground surface beneath the row unit to a depth of penetration of the ground penetrating element;
an adjustable-depth gauge wheel; and
a depth control arrangement operatively connecting the gauge wheel to the frame for selectively regulating the depth of penetration of the ground penetrating element, the depth control arrangement comprising:
a linkage arrangement including a first end and a second end;
a depth selector arrangement pivotably coupled to the first end of the linkage arrangement such that movement of the depth selector arrangement results in movement of the linkage arrangement; and
a suspension crank supporting the gauge wheel for rotation relative thereto and being pivotably connected to the row unit frame, the suspension crank including a depth control arm that sets a relative height of the gauge wheel based on a position of the second end of the linkage arrangement;
wherein the depth control arrangement further comprises a load-sensing element configured and operatively connected within the depth control arrangement for detecting a present value of a load on the depth control arrangement when the ground penetrating element and the gauge wheel are both in contact with the ground surface beneath the row unit, and for generating an output signal indicative of the present value of the load on the depth control arrangement.

2. The row unit of claim 1, wherein the load-sensing element includes a strain gauge for detecting the present value of a load on the depth control arrangement.

3. The row unit of claim 1, wherein the load-sensing element is provided in operative association with the linkage arrangement for detecting a present value of a load on the linkage arrangement that is representative of the present value of the load on the depth control arrangement.

4. The row unit of claim 3, wherein the depth selector arrangement is configured for receiving a desired depth input and adjustin the depth of penetration of the gauge wheel according to the received desired depth input.

5. The row unit of claim 4 wherein:
the depth selector arrangement defines a desired depth input setting corresponding to a zero-depth of penetration by the ground penetrating element; and
the linkage arrangement further includes a calibration arrangement for adjusting a length of the linkage arrangement defined between the first and second ends of the linkage arrangement to set the relative height of the gauge wheel with respect to the ground penetrating element in a manner that provides a zero-depth of penetration of the ground penetrating element when the depth selector arrangement is set to a zero-depth of penetration position.

6. The row unit of claim 5, wherein the load-sensing element is provided in operative associated with the calibration arrangement.

7. The row unit of claim 1, wherein:
the load-sensing element provides an electrical output signal that is indicative of the present load on the depth control arrangement;
the load-sensing element us in electrical communication with a signal processor;
the signal processor is adapted to receive the present load signal from the load-sensing element and provide an output signal indicative of the present load on the depth control arrangement to a display; and
the display is configured to provide a visual indication of the present load on the depth control arrangement in accordance with the output signal from the signal processor.

8. The row unit of claim 5, wherein:
the calibration arrangement includes a calibration bolt that is rotatable to adjust the length of the linkage arrangement defined between the first and second ends of the linkage arrangement; and
the load-sensing element and the calibration bolt are provided in operative association with one another such that a present load on the linkage arrangement as sensed by the load-sensing element is adjustable by rotating the calibration bolt.

9. An agricultural planter, comprising:
a toolbar;
one or more row units operatively attached to the toolbar, each of the one or more row units comprising:
a row unit frame adapted for attachment to a tool bar of the agricultural planter;

a ground penetrating element operatively connected to the frame and configured for penetrating a ground surface beneath the row unit to a depth of penetration of the ground penetrating element;
an adjustable-depth gauge wheel; and
a depth control arrangement operatively connecting the gauge wheel to the frame for selectively regulating the depth of penetration of the ground penetrating element, the depth control arrangement comprising:
    a linkage arrangement including a first end and a second end;
    a depth selector arrangement pivotably coupled to the first end of the linkage arrangement such that movement of the depth selector arrangement results in movement of the linkage arrangement; and
    a suspension crank supporting the gauge wheel for rotation relative thereto and being pivotably connected to the row unit frame, the suspension crank including a depth control arm that sets a relative height of the gauge wheel based on a position of the second end of the linkage arrangement;
wherein the depth control arrangement further comprises a load-sensing element configured and operatively connected within the depth control arrangement for detecting a present value of a load on the depth control arrangement when the ground penetrating element and the gauge wheel are both in contact with the ground surface beneath the row unit, and for generating an output signal indicative of the present value of the load on the depth control arrangement.

10. The agricultural planter of claim 9, wherein the load-sensing element includes a strain gauge for detecting the present value of a load on the depth control arrangement.

11. The agricultural planter of claim 9, wherein the load-sensing element is provided in operative association with the linkage arrangement for detecting a present value of a load on the linkage arrangement that is representative of the present value of the load on the depth control arrangement.

12. The agricultural planter of claim 11, wherein the depth selector arrangement is configured for receiving a desired depth input and adjusting the depth of penetration of the gauge wheel according to the received desired depth input.

13. The agricultural planter of claim 12 wherein:
the depth selector arrangement defines a desired depth input setting corresponding to a zero-depth of penetration by the ground penetrating element; and
the linkage arrangement further includes a calibration arrangement for adjusting a length of the linkage arrangement defined between the first and second ends of the linkage arrangement to set the relative height of the gauge wheel with respect to the ground penetrating element in a manner that provides a zero-depth of penetration of the ground penetrating element when the depth selector arrangement is set to a zero-depth of penetration position.

14. The agricultural planter of claim 13, wherein the load-sensing element is provided in operative associated with the calibration arrangement.

15. The agricultural planter of claim 9, wherein:
the load-sensing element provides an electrical output signal that is indicative of the present load on the depth control arrangement;
the load-sensing element us in electrical communication with a signal processor;
the signal processor is adapted to receive the present load signal from the load-sensing element and provide an output signal indicative of the present load on the depth control arrangement to a display; and
the display is configured to provide a visual indication of the present load on the depth control arrangement in accordance with the output signal from the signal processor.

16. The agricultural planter of claim 13, wherein:
the calibration arrangement includes a calibration bolt that is rotatable to adjust the length of the linkage arrangement defined between the first and second ends of the linkage arrangement; and
the load-sensing element and the calibration bolt are provided in operative association with one another such that a present load on the linkage arrangement as sensed by the load-sensing element is adjustable by rotating the calibration bolt.

17. A method for calibrating a depth control arrangement of one or more row units adapted for attachment to a toolbar of an agricultural planter, where each row unit has a linkage arrangement including a first end and a second end, and a depth selector arrangement pivotably coupled to the first end of the linkage arrangement such that movement of the depth selector arrangement results in movement of the linkage arrangement, the row unit further comprising a suspension crank supporting an adjustable-depth gauge wheel of the row unit for rotation relative thereto, the suspension crank including a depth control arm that sets a relative height of the gauge wheel based on a position of the second end of the linkage arrangement, the method comprising:
    measuring a present load on the linkage arrangement; and
    adjusting a calibration mechanism of the linkage arrangement to adjust a length of the linkage arrangement defined between the first and second ends of the linkage arrangement, which adjusts a value of the present load on the linkage arrangement.

18. The method of claim 17, further comprising placing a ground penetrating element of the row unit and the gauge wheel in a known positional relationship to one another prior to adjusting the calibration mechanism.

19. The method of claim 18, wherein the known positional relationship is a zero-depth position of the ground penetrating element and the gauge wheel.

20. The method of claim 19 further comprising simultaneously placing two or more row units of the planter in the zero-depth position and using their respective calibration mechanisms and load-sensing elements to set the respective present loads on the linkage arrangement to achieve a uniform desired value of the present load on the linkage arrangement of each of the two or more row units.

* * * * *